(12) United States Patent
Saul

(10) Patent No.: US 6,301,561 B1
(45) Date of Patent: *Oct. 9, 2001

(54) AUTOMATIC SPEECH RECOGNITION USING MULTI-DIMENSIONAL CURVE-LINEAR REPRESENTATIONS

(75) Inventor: Lawrence Kevin Saul, Cranbury, NJ (US)

(73) Assignee: AT&T Corporation, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/664,050

(22) Filed: Sep. 18, 2000

Related U.S. Application Data

(63) Continuation of application No. 09/209,544, filed on Dec. 11, 1998, now Pat. No. 6,148,284.
(60) Provisional application No. 60/075,526, filed on Feb. 23, 1998.

(51) Int. Cl.[7] .............................. G10L 15/02; G10L 15/14
(52) U.S. Cl. .................... 704/256; 704/255; 704/251; 704/231
(58) Field of Search .................................. 704/254–256, 704/231, 251

(56) References Cited

U.S. PATENT DOCUMENTS

| | | | | |
|---|---|---|---|---|
| 4,803,729 | * | 2/1989 | Baker ................................... | 704/254 |
| 5,864,810 | * | 1/1999 | Digalakis et al. .................... | 704/255 |
| 5,893,058 | * | 4/1999 | Kosaka ................................. | 704/254 |
| 5,946,656 | * | 8/1999 | Rahim et al. ........................ | 704/256 |
| 6,185,528 | * | 2/2001 | Fissore et al. ....................... | 704/256 |

OTHER PUBLICATIONS

Lawrence Rabiner et al., Chapter 3 "Signal Processing and analysis Methods for speech recognition", *Fundamentals of Speech Recognition*, pp. 68–139, 200–209.

Rahim et al. ("Minimum Classification Error Factor Analysis for Automatic Speech Recognition", Dec. 1997).

Saul et al. ("Markov Decision Processes in Large State Space," $8^{th}$ Conference on Computational Learning Theory, Jul. 1995).

Saul et al. (Learning Curve Bounds for a Markov Decision Process with Undiscounted Rewards, $9^{th}$ Conf. On Computational Learning Theory, Jul. 1996).

Rahim et al ("Minimum Classification Error Factor Analysis for Automatic Speech Recognition", Dec. 1997).*

Saul et al ("Markov Decision Processes in Large State Spaces," 8th Conference on Computational Learning Theory, Jul. 1995).*

Saul et al ("Learning Curve Bounds for a Markov Decision Process with Undiscounted Rewards," 9th Conf. on Computational Learning Theory, Jul. 1996).*

* cited by examiner

*Primary Examiner*—Richemond Dorvil
*Assistant Examiner*—Daniel A. Nolan
(74) *Attorney, Agent, or Firm*—Oliff & Berridge, PLC.

(57) ABSTRACT

A method and apparatus for speech recognition using Markov processes on curves are presented. The method and apparatus operate such that input speech utterances are received and represented as multidimensional curves. The curve is split into acoustic segments representing different components based on initial model estimates. The segments are used to create a new statistical model for the curve. The process may be reiterated to produce a more precise statistical model for recognition. As a result, feature vectors are extracted from input speech and contribute to a recognition score in proportion to their arc length. The arc lengths are weighted to minimize recognition errors due to variations in speaking rate. In addition, more importance is attached to short-lived but non-stationary sounds, such as consonants.

24 Claims, 7 Drawing Sheets

| mixtures | HMM | MPC |
|---|---|---|
| 4 | 12.5 | 10.0 |
| 8 | 10.7 | 8.8 |
| 16 | 10.0 | 8.2 |

| mixtures | HMM | MPC |
|---|---|---|
| 2 | 22.3 | 20.9 |
| 4 | 18.9 | 17.5 |
| 8 | 16.5 | 15.1 |
| 16 | 14.6 | 13.3 |
| 32 | 13.5 | 12.3 |
| 64 | 11.7 | 11.4 |

AUTOMATIC SPEECH RECOGNITION USING MULTI-DIMENSIONAL CURVE-LINEAR REPRESENTATIONS

This application is a continuation of Ser. No. 09/209,544 filed Dec. 11, 1998 now U.S. Pat. No. 6,148,284 and also claims the benefit of U.S. Provisional Application No. 60/075,526, filed Feb. 23, 1998, the subject matter of which is incorporated herein by reference.

BACKGROUND OF THE INVENTION

1. Field of Invention

The invention relates to automatic speech recognition using Markov processes on multidimensional curves.

2. Description of Related Art

Variations in speaking rate currently present a serious challenge for automatic speech recognition (ASR). It is widely observed, for example, that fast speech is more prone to recognition errors than slow speech.

A related effect, occurring at the phoneme level, is that consonants are more frequently misinterpreted than vowels. Consonants have short-lived, non-stationary acoustic signatures, while vowels have the opposite, namely stationary acoustic signatures. Thus, at the phoneme level, the error rate for recognition of consonants may be significantly increased as a consequence of locally fast speech.

SUMMARY OF THE INVENTION

A method and apparatus for speech recognition using Markov processes on curves is presented. The method and apparatus operate such that input speech utterances are received and represented as multidimensional curves. The curve is split into acoustic segments representing different components based on initial model estimates. The segments are used to create a new statistical model for the curve. The process may be reiterated to produce a more precise statistical model for recognition.

As a result, feature vectors are extracted from input speech and contribute to a recognition score in proportion to their arc length. The arc lengths are weighted to minimize recognition errors due to variations in speaking rate. In addition, more importance is attached to short-lived but non-stationary sounds, such as consonants.

These and other features and advantages of this invention are described in or are apparent from the following detailed description of the preferred embodiments.

BRIEF DESCRIPTION OF THE DRAWINGS

The invention will be described with reference to the following drawings in which like reference numerals refer to like elements and wherein.

DETAILED DESCRIPTION OF PREFERRED EMBODIMENTS

The present invention relates to efficient decoding of input signals. Although the invention is described in the context of speech recognition, it has broader applications. For example, the invention may be useful in other communication, data and information systems that employ statistical modeling.

For clarity of explanation, embodiments of the present invention are presented herein as function blocks. The functions that these blocks represent may be provided through the use of either shared or dedicated hardware, including, but not limited to, hardware capable of executing software. Furthermore, the use of the term "processor" should not be construed to refer exclusively to hardware that is capable of executing software. Some embodiments may comprise both hardware, such as a digital signal processor (DSP), and software for performing the operations discussed below. Very large scale integration (VLSI) hardware embodiments of the present invention, as well as hybrid DSP/VLSI embodiments, may also be provided.

Figure 1:
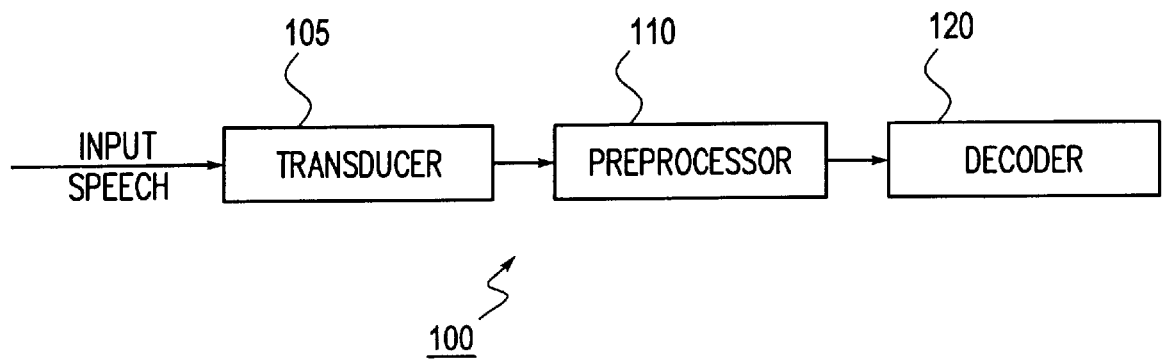
FIG. 1 is a functional block diagram of a speech recognition system.
Figure 3:
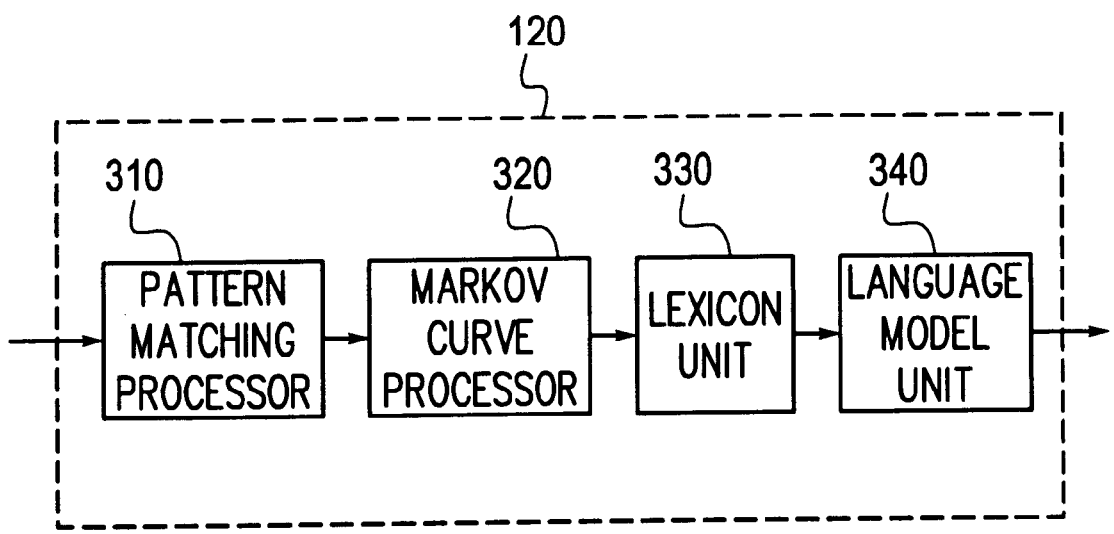
FIG. 3 is a functional block diagram of the decoder of the speech recognition system of FIG. 1.

FIG. 1 is a functional block diagram of the speech recognition system in accordance with the present invention. Speech is converted to an analog signal using a transducer 105, such as a microphone. A preprocessor 110 receives the speech signal and converts it into a digital form embodying speech features that facilitate subsequent recognition by decoder 120. The decoder 120 transforms the digital signal into an appropriate word or sequence of words. Typically, the decoder 120 is constrained by a set of acoustic models that correspond to basic units of speech (e.g., phonemes, syllables and words), a lexicon that defines the vocabulary of the decoder in terms of the basic units, and a language or grammar model that specifies allowable sequences of vocabulary terms. These functional units are illustrated in FIG. 3 and discussed below.

Figure 2:
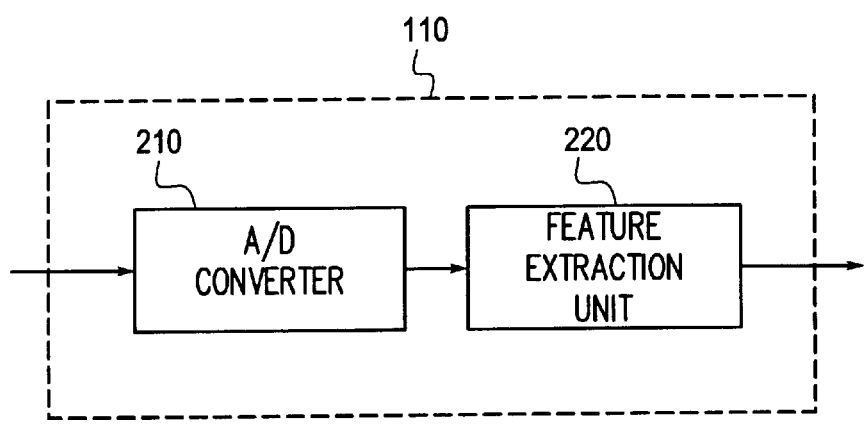
FIG. 2 is a functional block diagram of a signal preprocessor of the speech recognition system of FIG. 1.

FIG. 2 is a detailed functional diagram of the preprocessor 110. The preprocessor 110 comprises, e.g., an analog to digital (A/D) converter 210 and a feature extraction unit 220.

The A/D converter 210 receives input analog speech wave form signals and transforms them into corresponding digital signals. Illustrative A/D converters 210 may include an anti-aliasing filter in a high frequency pre-emphasis filter to spectrally flatten the analog signal. The signal is then digitized, for example, to 11 or 12 bits at a rate from approximately 6 kHz to 20 kHz. In general, the sampling rate is about twice the bandwidth of the communication channel. For example, the sampling rate of 8 kHz is the standard for conventional telecommunications channel having a band width of 4 kHz. The output of the A/D converter 210 is a digital representation of the speech signal. This signal can be described as the product of a source spectrum, i.e., input analog speech signal and a transfer function of the A/D converters 210 filters.

Feature extraction unit 220 provides a parametric representation of the speech signal. Conventional techniques, such as a filter bank, for a transformation, Linear Predictive Coding (LPC), and/or cepstral Analysis may be employed to obtain the parameters. Such techniques are described in *Fundamentals of Speech Recognition*, L. R. Rabiner and B. H. Juang, Prentice Hall, 1993, the subject matter of which is incorporated herein by reference. The set of parameters referred to as a "feature vector" is computed from a frame of speech data defined by windowing a certain number of samples of the signal. Each frame represents an observation. Typically, the frame rate is less than the window width, i.e., overlapping frames, in order to avoid aliasing.

Speech recognition systems 100 work by attaching numeric scores to possible transcriptions of unlabeled utterances. In conventional algorithms for automatic speech recognition, such as those disclosed in U.S. patent application Ser. No. 08/861,413, "Unsupervised HMM Adaptation Based on Speech/Silence Discrimination", filed May 21, 1997, the subject matter of which is incorporated herein by reference, feature vectors that have been extracted by the system contribute equally to the scores.

However, the feature extraction unit 220 extracts feature vectors that contribute by an amount proportional to their arc length. Methods from differential geometry, for example, may be used to compute the arc lengths, as discussed below.

Typically, approximately 10–20 basic features are included, along with their first and second derivatives. Accordingly, the input voice signal is transformed into a sequence of feature vectors constituting, e.g., an observation sequence, $O=(o_1, o_2, \ldots o_n)$, having "n" number of feature vectors.

FIG. 3 is a detailed functional block diagram of decoder 120, which transforms the sequence of feature vectors, in the form of arc lengths, received from the preprocessor 110 into a sequence of speech units. As shown, decoder 120 may include a pattern matching processor 310, a Markov curve processor 320, lexicon unit 330 and a language model unit 340.

The operation of the Markov curve processor 320 is based on the observation that acoustic feature vectors trace out continuous trajectories, as discussed below with reference to FIGS. 4 and 5. These continuous trajectories are viewed as multi-dimensional curves whose intrinsic geometric properties, such as arc length or radius, do not depend on the rate at which they are traversed. Such a probabilistic model whose predictions are based on these intrinsic geometric properties, and, as such, are invariant to non-linear warpings of time, are described further below. This handling of invariance distinguishes MPCs from traditional Hidden Markov Models (HMMs).

Speech recognizers take a continuous acoustic signal as input and return a sequence of discrete labels representing phonemes, syllables, or words as output. Typically the short-time properties of the acoustic signal are summarized by cepstral feature vectors. Thus, the abstract mathematical problem is to describe a multidimensional trajectory $\{x(t) | t \in [0,\tau]\}$ by a sequence of discrete labels $s_1 s_2 \ldots s_n$. As shown in FIG. 5, this is done by specifying consecutive time intervals such that $s(t)=S_k$ for $t \in [t_{k-1}, t_k]$ and attaching the labels $S_k$ to contiguous arcs along the trajectory. To formulate a probabilistic model of this process, two variables are considered—one continuous (x), one discrete (s)—that evolve jointly in time. Thus, the vector x traces out a smooth multidimensional curve, to each point of which the variable s attaches a discrete label.

Markov processes on curves are based on the concept of arc length. Let $g(x)$ define a D×D matrix-valued function over $x \in R^D$. If $g(x)$ is everywhere non-negative definite, then it can be used as a metric to compute distances along curves.

In particular, consider two nearby points separated by the infinitesimal vector dx. The squared distance between these two points is defined as:

$$dl^2 = dx^T g(x) dx. \tag{1}$$

Arc length along a curve is the non-decreasing function computed by integrating these local distances. Thus, for the trajectory $x(t)$, the arc length between the points $x(t_1)$ and $x(t_2)$ is given by:

$$l = \int_{t_1}^{t_2} dt [\dot{x}^T g(x) \dot{x}]^{\frac{1}{2}}, \tag{2}$$

where $$\dot{x} = \frac{d}{dt}[x(t)]$$

denotes the time derivation of x. Note that the arc length between two points is invariant under reparameterizations of the trajectory, $x(t) \rightarrow x(f(t))$, where $f(t)$ is any smooth monotonic function of time that maps the interval $[t_1, t_2]$ into itself.

In the special case where $g(x)$ is the identity matrix, eq. (2) reduces to the standard definition of arc length in Euclidean space. More generally, however, eq. (1) defines a non-Euclidean metric for computing arc lengths. Thus, for example, if the metric $g(x)$ varies as a function of x, then eq. (2) can assign different arc lengths to the trajectories $x(t)$ and $x(t)+x_0$, where $x_0$ is a constant displacement.

Figure 4:
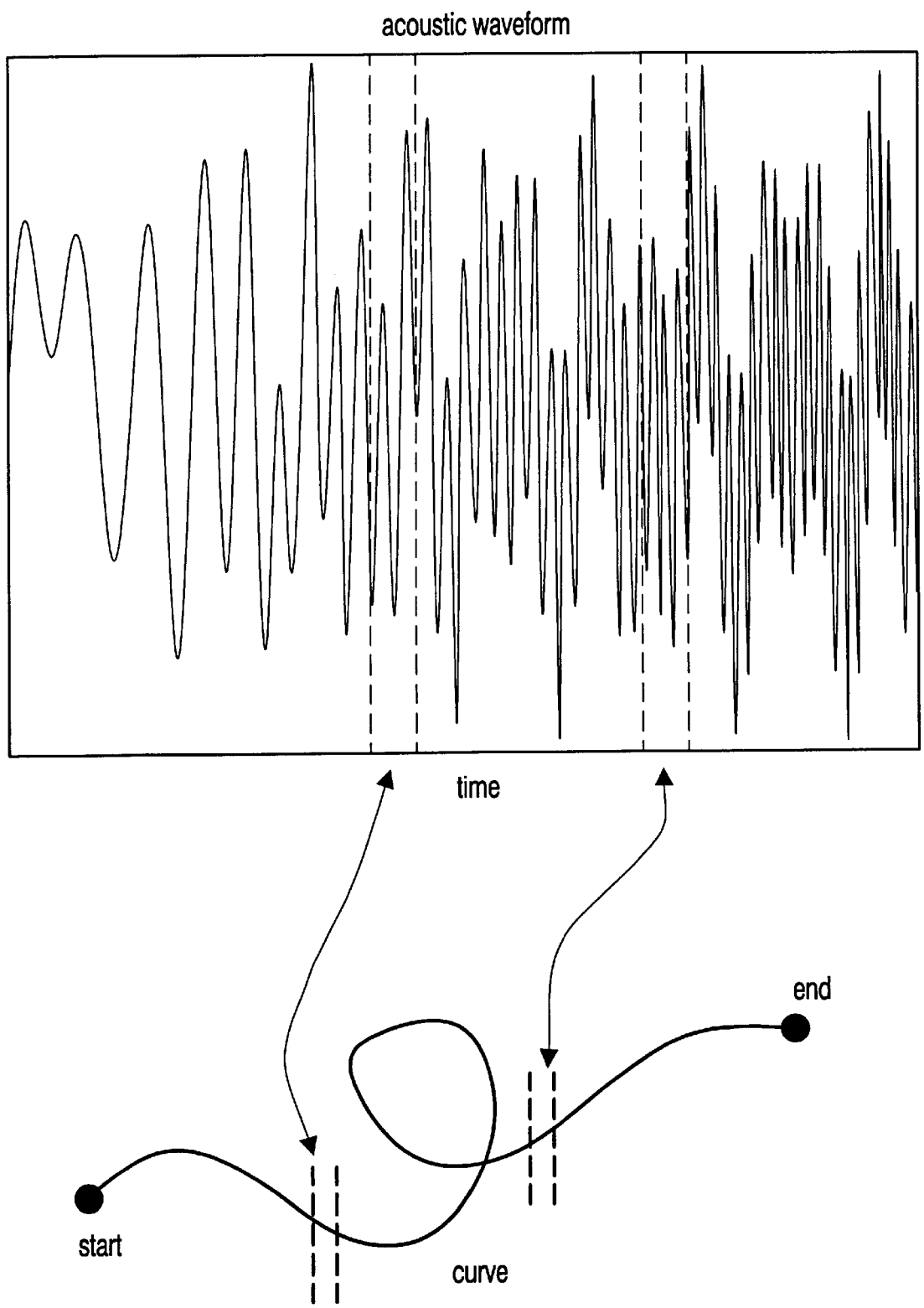
FIG. 4 is an illustrative example of an acoustic way for being plotted as a Markov Processes on Curve (MPC)
Figure 5:
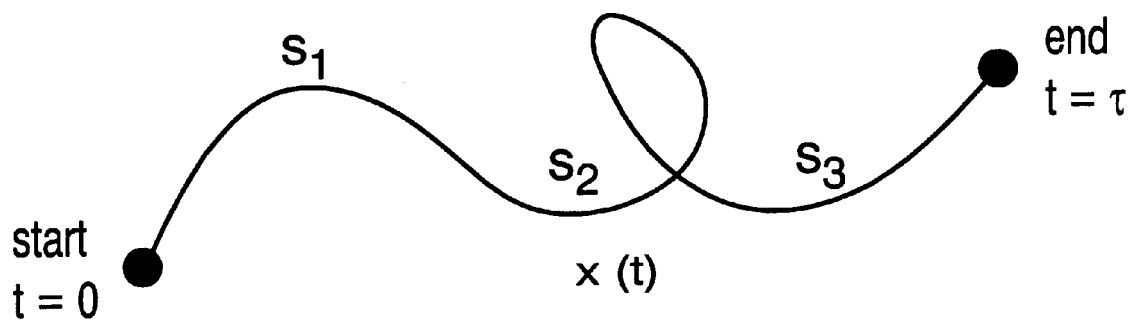
FIG. 5 is a illustrative example of an MPC.

As illustrated in FIGS. 4 and 5, the possible values of s are referred to as states. MPCs are conditional random processes that evolve the state variable s scholastically as a function of the arc length traversed along the curve of x. In MPCs, the probability of remaining in a particular state decays exponentially with the cumulative arc length traversed in that state. The signature of a state is the particular way in which it computes arc length.

To formalize this idea, we associate with each state i the following quantities: (i) a feature-dependent matrix $g_i(x)$ that can be used to compute arc lengths, as in eq. (2); (ii) a decay parameter $\lambda_i$ that measures the probability per unit arc length that s makes a transition from state i to some other state; and (iii) a set of transition probabilities $a_{ij}$, where $a_{ij}$ represents the probability that--having decayed out of state i—the variable s makes a transition to state j. Thus, $a_{ij}$ defines a stochastic transition matrix with zero elements along the diagonal and rows that sum to one: $a_{ii}=0$ and $\Sigma_j a_{ij}=1$. A Markov process is defined by the set of differential equations:

$$\frac{dp_i}{dt} = -\lambda_i p_i [\dot{x}^T g_i(x) \dot{x}]^{\frac{1}{2}} + \sum_{j \neq i} \lambda_j p_j a_{ji} [\dot{x}^T g_i(x) \dot{x}]^{\frac{1}{2}}, \tag{3}$$

where $p_i(t)$ denotes the (forward) probability that s is in state i at time t, based on its history up to that point in time. The first term computes the probability that s decays out of state i; the second computes the probability that s decays into state i. Both terms are proportional to measures of arc length, making the evolution of $p_i$ along the curve of x invariant to nonlinear warpings of time. The decay parameter, $\lambda_i$, controls the typical amount of arc length traversed in state i; it may be viewed as an inverse lifetime or—to be more precise—an inverse lifelength. The entire process is Markovian because the evolution of $p_t$ depends only on quantities available at time t.

Given a trajectory x(t), the Markov process in eq. (3) gives rise to a conditional probability distribution over possible segmentations, s(t). Consider the segmentation in which s(t) takes the value $s_k$ between times $t_{k-1}$ and $t_k$, and let $$l_{s_k} = \int_{t_{k-1}}^{t_k} dt [\dot{x}^T g_{s_k}(x) \dot{x}]^{\frac{1}{2}} \qquad (4)$$

denote the arc length traversed in state $s_k$. By integrating eq. (3), one can show that the probability of remaining in state $s_k$ decays exponentially with the arc length $l_{s_k}$. Thus, the conditional probability of the overall segmentation is given by:

$$Pr[s|x] = \prod_{k=1}^{n} \lambda_{s_k} e^{-\lambda_{s_k} l_{s_k}} \prod_{k=0}^{n} a_{s_k s_{k+1}} \qquad (5)$$

where we have used $s_0$ and $s_n+1$ to denote the START and END states of the Markov process. The first product in eq. (5) multiplies the probabilities that each segment traverses exactly its observed arc length. The second product multiplies the probabilities for transitions between states $s_k$ and $s_{k+1}$. The leading factors of $\lambda_{s_k}$ are included to normalize each state's duration model.

There are many important quantities that can be computed from the distribution, Pr[s|x]. Of particular interest for ASR is the most probable segmentation: $s^*(x) = \text{argmax}_s \{\ln Pr[s|x]\}$. This maximization can be performed by discretizing the time axis and applying a dynamic programming procedure.

The parameters $\{\lambda_i, a_{ij}, g_i(x)\}$ in MPCs are estimated from training data to maximize the log-likelihood of target segmentations. In our preliminary experiments with MPCs, we estimated only the metric parameters, $g_i(x)$; the others were assigned the default values $\lambda_i=1$ and $a_{ij}=1/f_i$, where $f_i$ is the fan out of state i. The metrics $g_i(x)$ were assumed to have the parameterized form:

$$g_i(x) = \sigma_i^{-1} \Phi_i^2(x) \qquad (6)$$

where $\sigma_i$ is a positive definite matrix with unit determinant, and $\Phi_i(x)$ is a non-negative scalar-valued function of x. The form of $\Phi_i(x)$ was fixed so that the MPCs reduced to HMMs as a special case, as described below. Thus, the only learning problem was to estimate the matrix parameters $\Phi_i$. This was done using the re-estimation formula:

$$\sigma \leftarrow C \int dt \frac{\dot{x}\dot{x}^T}{([\dot{x}^T \sigma_i^{-1} \dot{x}])^{\frac{1}{2}}} \Phi_i(x(t)), \qquad (7)$$

where the integral is over all speech segments belonging to state i, and the constant C is chosen to enforce the determinant constraint $|\sigma_i|=1$. For fixed $\Phi_i(x)$, this iterative update leads to monotonic increases in the log-likelihood.

There are several important differences between the HMMs such as those discussed in U.S. patent application Ser. No. 08/861,413, and MPCs. HMMs parameterize joint distributions of the fonn $Pr[s, x] = \pi_r Pr[s_{t+1}|s_t] Pr[x_t|s_t]$. Thus, in HMMs, parameter estimation is directed at learning a synthesis model, Pr[x|s], while in MPCs, it is directed at learning a recognition model, Pr[s|x]. The direction of conditioning is a crucial difference. MPCs do not attempt to learn anything as ambitious as a joint distribution over acoustic feature trajectories.

HMMs and MPCs also differ in how they weight the speech signal. In HMMs, each state contributes an amount to the overall log-likelihood that grows in proportion to its (temporal) duration. In MPCs, on the other hand, each state contributes an amount that grows in proportion to its arc length. Naturally, the weighting by arc length attaches a more important role to short-lived but non-stationary phonemes, such as consonants. It also guarantees the invariance to nonlinear warpings of time (to which the predictions of HMMs are quite sensitive). In addition, MPCs differ from segmental HMMs in two important respects: the invariance to nonlinear warpings of time, and the emphasis on learning a recognition model Pr[s|x], as opposed to a synthesis model, Pr[x|s].

Finally, we note that, admitting a slight generalization in the concept of arc length, HMMs can be viewed as a special case of MPCs. This is done by computing arc lengths along the spacetime trajectories $X(t) = \{x(t), t\}$—that is to say, replacing eq. (1) by $dL^2 = [\dot{X}^T G(X) \dot{X}] dt^2$, where $\dot{X} = \{\dot{x}, 1\}$ and G(X) is a spacetime metric. In this setting, one can realize HMMs as a special case of MPCs where the $\sigma_i$ matrices have only one non-zero element (namely, the diagonal element for delta-time contributions to the arc length) and where the functions $\Phi_i(x)$ are related to the HMM emission probabilities P(x|s=i) by:

$$\Phi_i(x) = \ln \left[ \frac{P(x|s=i)}{\sum_k P(x|s=k)} \right]. \qquad (8)$$

This relation is important because it allows us to initialize the parameters of an MPC by those of a continuous-density HMM. This initialization was used in al the experiments reported below.

Figure 6:
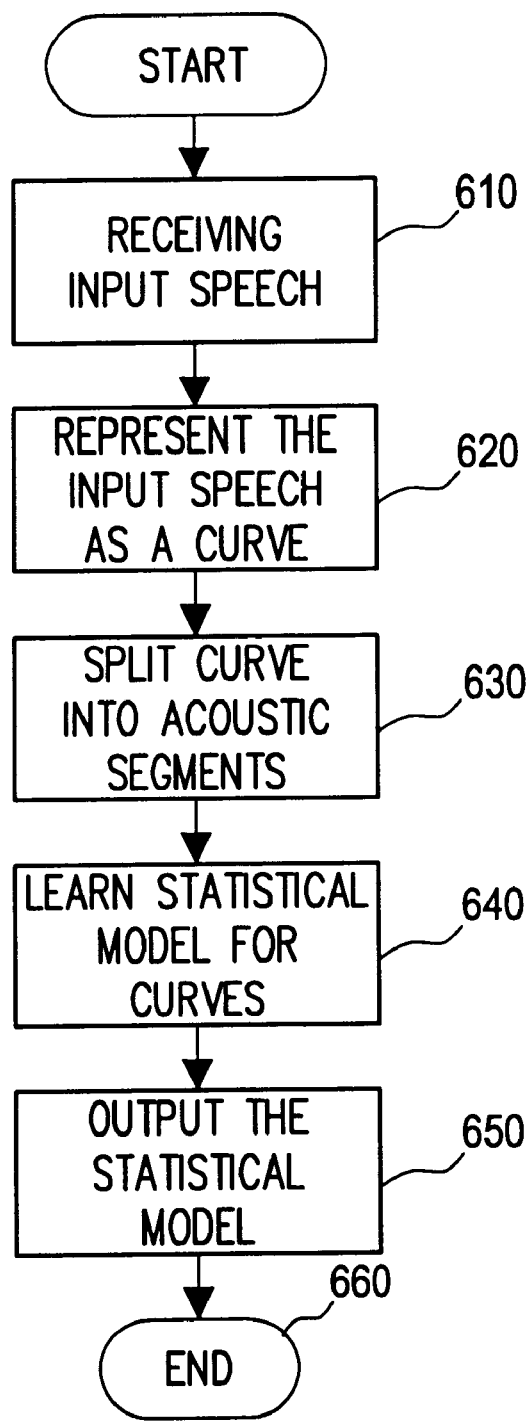
FIG. 6 is a flowchart illustrating Markov processing on curves.

FIG. 6 is a flowchart describing Markov processing on curves as it relates to speech recognition. At step 610, input speech is received. At step 620, the input speech is represented as arc lengths which make up a curve. Then, at step 630, the individual speech components are recognized and split into acoustic segments. For example, for the word "cat", the /k/, /ae/, and /t/ sounds are separately recognized and segmented, such as segments $s_1$, $s_2$ and $s_3$ in FIG. 5. These acoustic segments are determined based on initial estimates speech models.

In step 640, the segments are used to learn statistical models and improve the recognition of future input speech. For example, the segment of the curve for $s_1$ may be stored and used to aid the speech recognizer in identifying future $s_1$'s. In step 650, the statistical model is output and the process goes to step 660 and ends.

Although the flowchart in FIG. 6 is shown to be a one-time process, the process may be iterative. For example, in order to get a more accurate segmentation of the curve, and more accurate speech recognition, the splitting and learning steps may be performed a predetermined number of times prior to the outputting of the statistical model.

With reference to FIGS. 7–10, experimental data is illustrated using both HMMs and MPCs in building connected speech recognizers. Training and test data came from speaker-independent databases of telephone speech. All data was digitized at the caller's local switch and transmitted in this form to the receiver. The training data consisted of 12,100 short phrases, spoken in the seven major dialects of American English. These phrases, ranging from two to four words in length, were carefully selected to provide maximum phonetic coverage. The test data consisted of 2,426 isolated utterances of 1,219 New Jersey town names and was collected from nearly 100 speakers. Note that the training and test data for this task have non-overlapping vocabularies.

For feature extraction, the input telephone signal (sampled at 8 kHz and band-limited between 100–3800 Hz) was pre-emphasized and blocked into 30 ms frames with a frame shift of 10 ms. Each frame was Hamming windowed, autocorrelated, and processed by LPC cepstral analysis to produce a vector of 12 filtered cepstral coefficients. The feature vector was then augmented by its normalized log energy value, as well as temporal derivatives of first and second order. Overall, each frame of speech was described by 39 features.

Baseline recognizers were built using 43 left-to-right continuous-density HMMs, each corresponding to a context-independent English phone. The phones were modeled by three-state HMMs, with the exception of background noise, which was modeled by a single state. State emission probabilities were computed by mixtures of Gaussians with diagonal covariance matrices. Different sized models were trained using M=2, 4, 8, 16, 32, and 64 mixture components per hidden state; for a particular model, the number of mixture components was the same across all states. Parameter estimation was handled by a Viterbi implementation of the Baum-Welch algorithm.

MPC recognizers were built using the same overall grammar. Each hidden state in the MPCs was assigned a metric $g_i(x)=\sigma_i^{-1}\Phi_i^2(x)$. The functions $\Phi_i(x)$ were initialized (and fixed) by the state emission probabilities of the HMMs, as given by eq. (8). The matrices $\sigma_i$ were estimated by iterating eq. (7). Arc lengths were computed along the 14 dimensional spacetime trajectories through cepstra, log-energy, and time. Thus, each $\sigma_i$ was a 14×14 synmmetric matrix applied to tangent vectors consisting of delta-cepstra, delta-log-energy, and delta-time.

FIGS. 7–10 show the results of a set of experiments comparing MPCs to HMMs. For various model sizes (as measured by the number of mixture components), the MPCs were found to yield consistently lower error rates than the HMMs. The recognition of alpha digits and New Jersey town names is a difficult task (especially for context-independent models), and that at this operating point, absolute reductions in word error rates of 1–2% are not insignificant. The HMM baseline on this task represents the state-of-the-art for context-independent ASR.

Figures 7, 8:
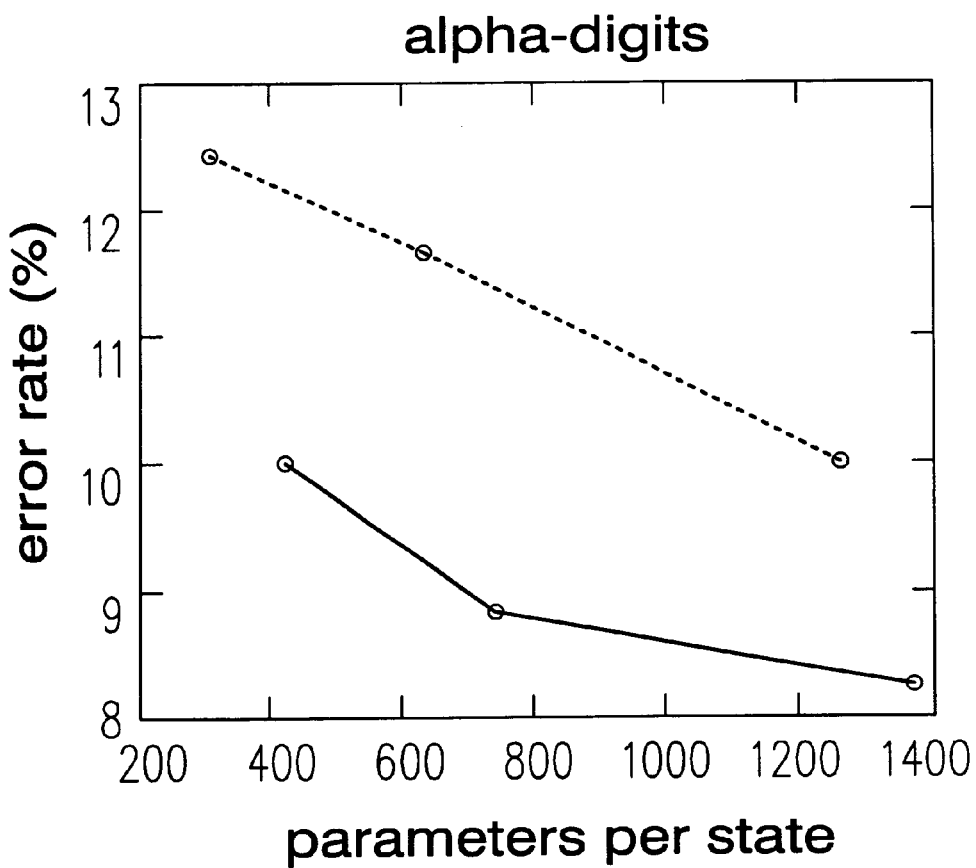
FIG. 7 is chart of word error rates for Hidden Markov Models (HMMs) and MPCs on alpha digits.
FIG. 8 is a graph illustrating the word error rates of FIG. 7.
Figures 9, 10:
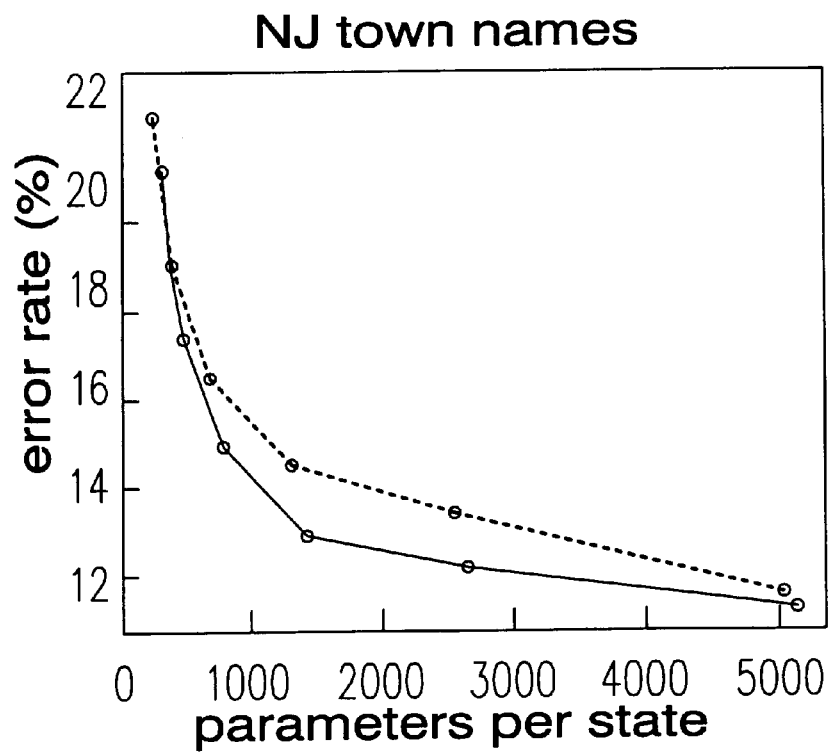
FIG. 9 is a chart of word error rates for HMMs and MPCs for New Jersey town names.
FIG. 10 is a graph of the word error rates of FIG. 9.

Obviously it is important to establish that the MPCs are not out performing the HMMs merely because they have extra modeling parameters (i.e., the $\sigma_i$-matrices) or because the search levels were not equalized in the decoding procedures. FIGS. 8 and 10 plot the word error rates in FIGS. 7 and 9 versus the number of modeling parameters per hidden state, thus accounting for the additional matrix parameters required by MPCs. These results are for the HMM and MPC recognizers with M=32 mixture components, and the x-axis in this graph shows the mean number of active arcs (per frame of speech) in the beam search. In these figures, one sees that in the regimes of interest, MPCs are yielding real improvements that cannot be explained away by experimental artifacts.

As shown above, the computational resources required for parameter estimation and decoding in MPCs are comparable to HMMs. For instance, training each MPC recognizer required only a few additional hours of CPU time. Second, these results are based adapting only a small fraction of the parameters available to MPCs. In particular, in these experiments fixed functions are re-estimated $\{\Phi_i(x)\}$ (as initialized by the HMMs) and only adapted the matrices $\{\sigma_i\}$. In the M=32 recognizer, these matrices account for less than 5% of the total number of modeling parameters. Further improvements in word accuracy are produced when the functions $\{\Phi_i(x)\}$ based on the values of the matrices $\{\sigma_i\}$. Finally, MPCs suggest an alternative to HMMs in which variations in speaking rate are modeled by a continuous mathematical symmetry. In this respect, MPCs can provide not only a more accurate basis for ASR, but a more principled one as well.

As shown in the flowchart in FIG. 6, the Markov curve processor is preferably implemented on a programmed general purpose computer. However, the Markov curve processor can also be implemented on a special purpose computer, a programmed microprocessor or microcontroller and peripheral integrated circuit elements, and ASIC or other integrated circuit, a hard wired electronic or logic circuit such as a discreet element circuit, a programmable logic device, such as a PLD, PLA, FPGA or PAL, or) the like. In general, any device in which a finite state machine capable of implementing the flowchart shown in FIG. 6 can be used to implement the Markov curve processor.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as described in the following claims.

What is claimed is:

1. A method for unsupervised generation of statistical models for speech, comprising:

receiving an input speech utterance;

representing the input speech utterance as a multi-dimensional curve;

segmenting the multi-dimensional curve into individual speech components;

producing a statistical model based on the segmented speech components; and outputting the statistical model.

2. The method of claim 1, wherein the segmented speech components are arc lengths that represent sound.

3. The method of claim 2, further comprising:

computing distances along the multi-dimensional curve; and generating arc lengths by integrating the computed distances.

4. The method of claim 3, wherein the distances are computed based on matrix valued functions.

5. The method of claim 2, wherein the arc lengths are generated along space-time trajectories.

6. The method of claim 1, wherein the statistical models are Markov Processes on Curves (MPCs).

7. The method of claim 6, further comprising:

initializing the MPCs using Hidden Markov Models (HMMs).

8. The method of claim 1, wherein the representing, segmenting and producing steps are performed a predetermined number of times before a statistical model is output.

9. An apparatus for unsupervised generation of statistical models for speech, comprising:

receiving means for receiving an input speech utterance;

representing means for representing the input speech utterance as a multi-dimensional curve;

segmenting means for segmenting the multi-dimensional curve into individual speech components;

modeling means for producing a statistical model based on the segmented speech components; and outputting means for outputting the statistical model.

10. The apparatus of claim 9, wherein the segmented speech components are arc lengths that represent sound.

11. The apparatus of claim 10, further comprising:

computing means for computing distances along the multi-dimensional curve; and generating means for generating arc lengths by integrating the computed distances.

12. The apparatus of claim 11, wherein the computing means computes the distances based on matrix valued functions.

13. The apparatus of claim 10, wherein the generating means generates arc lengths along space-time trajectories.

14. The apparatus of claim 9, wherein the statistical models are Markov Processes on Curves (MPCs).

15. The apparatus of claim 14, flirter comprising:

initializing means for initializing the MPCs using Hidden Markov Models (HMMs).

16. The apparatus of claim 9, wherein the representing means, segmenting means and modeling means perform their functions a predetermined number of times before the outputting means outputs a statistical model.

17. An apparatus for unsupervised generation of statistical models for speech, comprising:

a preprocessor that receives an input speech utterance; and a Markov curve processor, coupled to the preprocessor, that represents the input speech utterance received by the preprocessor as a multi-dimensional curve, segments the multi-dimensional curve into individual speech components, produces a statistical model based on the segmented speech components, and outputs the statistical model.

18. The apparatus of claim 17, wherein the segmented speech components are arc lengths that represent sound.

19. The apparatus of claim 18, wherein the Markov curve processor computes distances along the multi-dimensional curve, and generates arc lengths by integrating the computed distances.

20. The apparatus of claim 19, wherein the Markov curve processor computes the distances based on matrix valued functions.

21. The apparatus of claim 18, wherein the Markov curve processor generates arc lengths along space-time trajectories.

22. The apparatus of claim 17, wherein the statistical models are Markov Processes on Curves (MPCs).

23. The apparatus of claim 22, wherein the Markov curve processor initializes the MPCs using Hidden Markov Models (HMMs).

24. The apparatus of claim 17, wherein the Markov curve processor performs the representing, segmenting and producing functions a predetermined number of times before the outputting a statistical model.

* * * * *